US012224954B2

United States Patent
Pope et al.

(10) Patent No.: US 12,224,954 B2
(45) Date of Patent: *Feb. 11, 2025

(54) NETWORK INTERFACE DEVICE

(71) Applicant: Xilinx, Inc., San Jose, CA (US)

(72) Inventors: Steven L. Pope, Cambridge (GB); Dmitri Kitariev, Newport Beach, CA (US); Derek Roberts, Cambridge (GB)

(73) Assignee: XILINX, INC., San Jose, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 17/515,343

(22) Filed: Oct. 29, 2021

(65) Prior Publication Data

US 2022/0060434 A1 Feb. 24, 2022

Related U.S. Application Data

(63) Continuation of application No. 15/847,742, filed on Dec. 19, 2017, now Pat. No. 11,165,720.

(51) Int. Cl.
*G06N 20/00* (2019.01)
*G06F 9/50* (2006.01)
*H04L 9/40* (2022.01)
*H04L 45/00* (2022.01)
*H04L 47/34* (2022.01)
*H04L 49/90* (2022.01)

(52) U.S. Cl.
CPC ........ *H04L 49/9068* (2013.01); *G06F 9/5044* (2013.01); *G06N 20/00* (2019.01); *H04L 45/22* (2013.01); *H04L 47/34* (2013.01); *H04L 63/1416* (2013.01); *H04L 63/1458* (2013.01); *G06F 2209/509* (2013.01)

(58) Field of Classification Search
CPC ..... H04L 49/9068; H04L 47/34; H04L 45/22; H04L 63/1416; H04L 63/1458
USPC .......................................................... 709/250
See application file for complete search history.

(56) References Cited

U.S. PATENT DOCUMENTS 4,905,234 A 2/1990 Childress et al.
5,612,950 A 3/1997 Young
(Continued)

FOREIGN PATENT DOCUMENTS

CN 105516191 A 4/2016
EP 2463782 A2 6/2012
(Continued)

OTHER PUBLICATIONS

EP 18214016.0-1221—Extended European Search report dated May 8, 2019, 9 pages.
(Continued)

*Primary Examiner* — Sibte H Bukhari
(74) *Attorney, Agent, or Firm* — HAYNES BEFFEL & WOLFELD LLP; Andrew L. Dunlap; Paul A. Durdik

(57) ABSTRACT

A network interface device has an interface configured to interface with a network. The interface is configured to at least one of receive data from the network and put data onto the network. The network interface device has an application specific integrated device with a plurality of data processing pipelines to process at least one of data which has been received from the network and data which is to be put onto said network and an FPGA arranged in a path parallel to the data processing pipelines.

17 Claims, 4 Drawing Sheets

(56) References Cited

U.S. PATENT DOCUMENTS

| | | | |
|---|---|---|---|
| 5,937,169 A | 8/1999 | Connery et al. | |
| 6,591,302 B2 | 7/2003 | Boucher et al. | |
| 6,708,218 B1 | 3/2004 | Ellington, Jr. et al. | |
| 6,965,941 B2 | 11/2005 | Boucher et al. | |
| 7,688,838 B1 | 3/2010 | Aloni et al. | |
| 7,818,563 B1 | 10/2010 | Dwork et al. | |
| 7,835,380 B1 | 11/2010 | Aloni et al. | |
| 7,869,352 B1 | 1/2011 | Turner et al. | |
| 8,346,919 B1 | 1/2013 | Eiriksson et al. | |
| 8,473,316 B1 | 6/2013 | Panzitta et al. | |
| 8,769,231 B1 | 7/2014 | Ansari et al. | |
| 8,789,135 B1 | 7/2014 | Pani | |
| 9,407,426 B2 | 8/2016 | Blumenthal et al. | |
| 9,456,060 B2 | 9/2016 | Pope et al. | |
| 10,686,731 B2 | 6/2020 | Pope et al. | |
| 10,686,872 B2 | 6/2020 | Pope et al. | |
| 10,886,218 B2 | 1/2021 | Teh et al. | |
| 2002/0174240 A1 | 11/2002 | Nason et al. | |
| 2002/0184487 A1 | 12/2002 | Badamo et al. | |
| 2003/0117958 A1 | 6/2003 | Nation et al. | |
| 2003/0231649 A1 | 12/2003 | Awoseyi et al. | |
| 2004/0010712 A1 | 1/2004 | Hui et al. | |
| 2004/0054813 A1 | 3/2004 | Boucher et al. | |
| 2004/0073716 A1 | 4/2004 | Boom et al. | |
| 2005/0010819 A1 | 1/2005 | Williams et al. | |
| 2005/0088969 A1 | 4/2005 | Carlsen et al. | |
| 2005/0125694 A1 | 6/2005 | Fakes et al. | |
| 2006/0023705 A1 | 2/2006 | Zoranovic et al. | |
| 2006/0026679 A1 | 2/2006 | Zakas | |
| 2006/0174242 A1 | 8/2006 | Zhu et al. | |
| 2007/0067497 A1 | 3/2007 | Craft et al. | |
| 2007/0150954 A1 | 6/2007 | Shon | |
| 2007/0174841 A1 | 7/2007 | Chamberlain et al. | |
| 2007/0208854 A1 | 9/2007 | Wiryaman et al. | |
| 2007/0209069 A1 | 9/2007 | Saklikar et al. | |
| 2007/0214504 A1 | 9/2007 | Milani Comparetti et al. | |
| 2008/0005776 A1 | 1/2008 | VerSteeg et al. | |
| 2008/0025515 A1 | 1/2008 | Coombs | |
| 2008/0140574 A1 | 6/2008 | Boucher et al. | |
| 2008/0189373 A1 | 8/2008 | Ikonen et al. | |
| 2008/0218205 A1 | 9/2008 | Madurawe | |
| 2008/0273532 A1 | 11/2008 | Bar-David et al. | |
| 2009/0204813 A1 | 8/2009 | Kwan | |
| 2010/0115621 A1 | 5/2010 | Staniford et al. | |
| 2011/0004771 A1 | 1/2011 | Matsushima et al. | |
| 2011/0040897 A1 | 2/2011 | Pope et al. | |
| 2011/0119673 A1 | 5/2011 | Bloch et al. | |
| 2011/0175645 A1 | 7/2011 | Hayasaka | |
| 2012/0017069 A1 | 1/2012 | Bourd et al. | |
| 2013/0003741 A1 | 1/2013 | Singh et al. | |
| 2013/0047160 A1 | 2/2013 | Conover | |
| 2013/0054857 A1 | 2/2013 | Horman et al. | |
| 2013/0080567 A1 | 3/2013 | Pope | |
| 2013/0145035 A1 | 6/2013 | Pope et al. | |
| 2013/0325998 A1 | 12/2013 | Hormuth et al. | |
| 2014/0279342 A1 | 9/2014 | Maynard | |
| 2014/0304802 A1 | 10/2014 | Pope et al. | |
| 2014/0310149 A1 | 10/2014 | Singh | |
| 2014/0310405 A1 | 10/2014 | Pope et al. | |
| 2014/0324939 A1 | 10/2014 | Bloch et al. | |
| 2015/0049763 A1 | 2/2015 | Michels et al. | |
| 2015/0244574 A1 | 8/2015 | Pirko | |
| 2015/0261556 A1 | 9/2015 | Jain et al. | |
| 2015/0372807 A1 | 12/2015 | Khoyi et al. | |
| 2016/0127494 A1 | 5/2016 | Liu et al. | |
| 2016/0301613 A1 | 10/2016 | Boucher et al. | |
| 2016/0344629 A1 | 11/2016 | Gray | |
| 2016/0352687 A1 | 12/2016 | Pope et al. | |
| 2016/0352870 A1 | 12/2016 | Manapragada et al. | |
| 2016/0373561 A1 | 12/2016 | Pope et al. | |
| 2017/0024338 A1* | 1/2017 | Lavasani | G06K 7/00 |
| 2017/0026497 A1 | 1/2017 | Pope et al. | |
| 2017/0094375 A1* | 3/2017 | Yamada | H04L 47/23 |
| 2017/0102950 A1* | 4/2017 | Chamberlain | G06N 20/00 |
| 2017/0171111 A1 | 6/2017 | Khare et al. | |
| 2017/0185549 A1 | 6/2017 | Pope | |
| 2017/0214775 A1 | 7/2017 | Pope et al. | |
| 2018/0191631 A1 | 7/2018 | Biederman et al. | |
| 2019/0190853 A1 | 6/2019 | Pope et al. | |
| 2019/0190982 A1 | 6/2019 | Pope et al. | |
| 2019/0199654 A1 | 6/2019 | Pope et al. | |
| 2021/0111116 A1 | 4/2021 | Teh et al. | |
| 2021/0318871 A1 | 10/2021 | Kale et al. | |

FOREIGN PATENT DOCUMENTS

| | | | | |
|---|---|---|---|---|
| WO | 2016003489 A1 | | 1/2016 | |
| WO | WO-2016010883 A1 * | | 1/2016 | G06F 15/167 |

OTHER PUBLICATIONS

U.S. Appl. No. 15/847,742—Office Acton dated Jul. 16, 2019, 32 pages.
EP 18214201.8-1213—Extended European Search Report dated May 17, 2019, 8 pages.
Jang et al., "Implementation of a Hybrid TCP/IP Offload Engine Prototype." In Asia-Pacific Conference on Advances in Computer Systems Architecture, pp. 464-477. Springer, Berlin, Heidelberg, 2005.
U.S. Appl. No. 16/226,453—Office Action dated Sep. 6, 2019, 34 pages.
U.S. Appl. No. 15/847,778—Office Action dated Sep. 6, 2019, 48 pages.
U.S. Appl. No. 15/847,778—Response to Office Action dated Sep. 6, 2019 filed Dec. 3, 2019, 16 pages.
U.S. Appl. No. 16/226,453—Response to Office Action dated Sep. 6, 2019 filed Dec. 6, 2019, 12 pages.
U.S. Appl. No. 16/226,453—Notice of Allowance dated Feb. 7, 2020, 14 pages.
U.S. Appl. No. 15/847,778—Notice of Allowance dated Feb. 7, 2020, 10 pages.
U.S. Appl. No. 15/847,742—Response to Office Acton dated Jul. 16, 2019, filed Nov. 18, 2019, 12 pages.
U.S. Appl. No. 15/847,742—Office Acton dated Feb. 12, 2020, 28 pages.
U.S. Appl. No. 16/121,366—Office Action dated Mar. 18, 2020, 15 pages.
U.S. Appl. No. 15/847,742—Response to Office Acton dated Feb. 12, 2020, filed May 12, 2020, 13 pages.
U.S. Appl. No. 15/847,742—Office Acton dated Aug. 18, 2020, 18 pages.
U.S. Appl. No. 16/121,366—Office Action dated Aug. 19, 2020, 17 pages.
U.S. Appl. No. 15/847,742—Office Acton dated Dec. 21, 2020, 15 pages.
EP 18214016.0—Office Action dated May 7, 2021, 11 pages.
Moller, Leandro, et al., "Improving QoS of Multi-Layer Networks-on-Chip with Partial and Dynamic Reconfiguration of Routers", 2010 International Conference on Field Programmable Logic and Applications, Aug. 31, 2010, 5 pages.
U.S. Appl. No. 15/847,742—Notice of Allowance dated Jul. 6, 2021, 16 pages.
Chen et al., "Using NetFPGA to Offload Linux Netfilter Firewall", 2nd North American NetFPGA Developers Workshop, Stanford, CA, USA, Aug. 2010, 8 pages.
Fiessler et al., "HyPaFilter+: Enhanced Hybrid Packet Filtering using Hardware Assisted Classification and Header Space Analysis", IEEE/ACM Transactions on Networking, 2017, 26 (6), 3655-3669, 15 pages.
EP 18214201.8—Notice of Opposition dated Nov. 9, 2021, 43 pages.

* cited by examiner

NETWORK INTERFACE DEVICE

PRIORITY DATA

This application is a continuation of U.S. patent application Ser. No. 15/847,742, entitled "NETWORK INTERFACE DEVICE", filed on Dec. 19, 2017. The non-provisional application is hereby incorporated by reference for all purposes.

FIELD

This invention relates to network interface devices for performing packet capture at a host data processing system.

Embodiments relate to a network interface device and a system comprising one or more network interface devices.

BACKGROUND

Network interface devices are known and are typically used to provide an interface between a computing device and a network. The network interface device can be configured to process data which is received from the network and/or process data which is to be put on the network.

For some network interface devices, there is a drive to provide increased specializations of designs towards specific applications.

SUMMARY

According to an aspect, there is provide a network interface device comprising: an interface configured to interface with a network, said interface configured to at least one of receive data from the network and put data onto said network; and an application specific integrated device comprising a plurality of data processing pipeline to process at least one of data which has been received from the network and data which is to be put onto said network and an FPGA arranged in a path parallel to the data processing pipelines.

The FPGA is thus embedded in the ASIC in some embodiments.

The FPGA may configured to perform one or more of the following:
reduce data in one or more flows;
aggregate data in one or more flows;
perform hybrid processing;
detect a denial of service attack;
machine learning;
perform a software defined networking function;
provide an OpenCL kernel offload;
provide an offload function; and
take remedial action against a denial of service attack.

The FPGA may be arranged to be reconfigurable.

The FPGA may be arranged to be reconfigurable while said interface is in use.

The network interface device may be configured to cause data to be explicitly dropped when said FPGA is being reconfigured while in use.

The network interface device may be configured to cause data to be routed to one or more of said data processing pipelines when said FPGA is being reconfigured while in use.

This routing may be temporary.

At least one data processing pipeline may be configured to process data received from the network and at least one data processing pipeline may be configured process data to be put onto said network.

At least one data processing pipeline may be configured to process data received from the network and process data to be put onto said network.

At least one data processing pipeline may be configured to switch from one of processing data received from the network and processing data to be put onto said network to the other of processing data received from the network and processing data to be put onto said network.

The network interface device may comprise a transaction ordering function configured to ensure that data from a given flow received from the network and which has been processed in a plurality of data processing paths is provided to the host device in a same order to that of the given flow.

The plurality of data processing paths may comprise at least one of said data processing pipelines and optionally said FPGA.

The network interface device may comprise a second interface, said second interface configured to interface with a peripheral device.

The peripheral device may be provided by said network interface device.

The peripheral device may be provided by a second application specific integrated device.

According to another aspect, there is provided a network interface device comprising: an interface configured to interface with a network, said interface configured to at least one of receive data from the network and put data onto said network; a plurality of data processing pipelines to process at least one of data which has been received from the network and data which is to be put onto said network, said plurality of data processing pipelines being provided by ASIC logic, and a data processing path arranged in parallel to the data processing pipelines, said data processing path being implemented by a programmable gate array.

BRIEF DESCRIPTION OF THE DRAWINGS

Some embodiments will now be described by way of example only, in which.

DETAILED DESCRIPTION OF THE DRAWINGS

Figure 1:
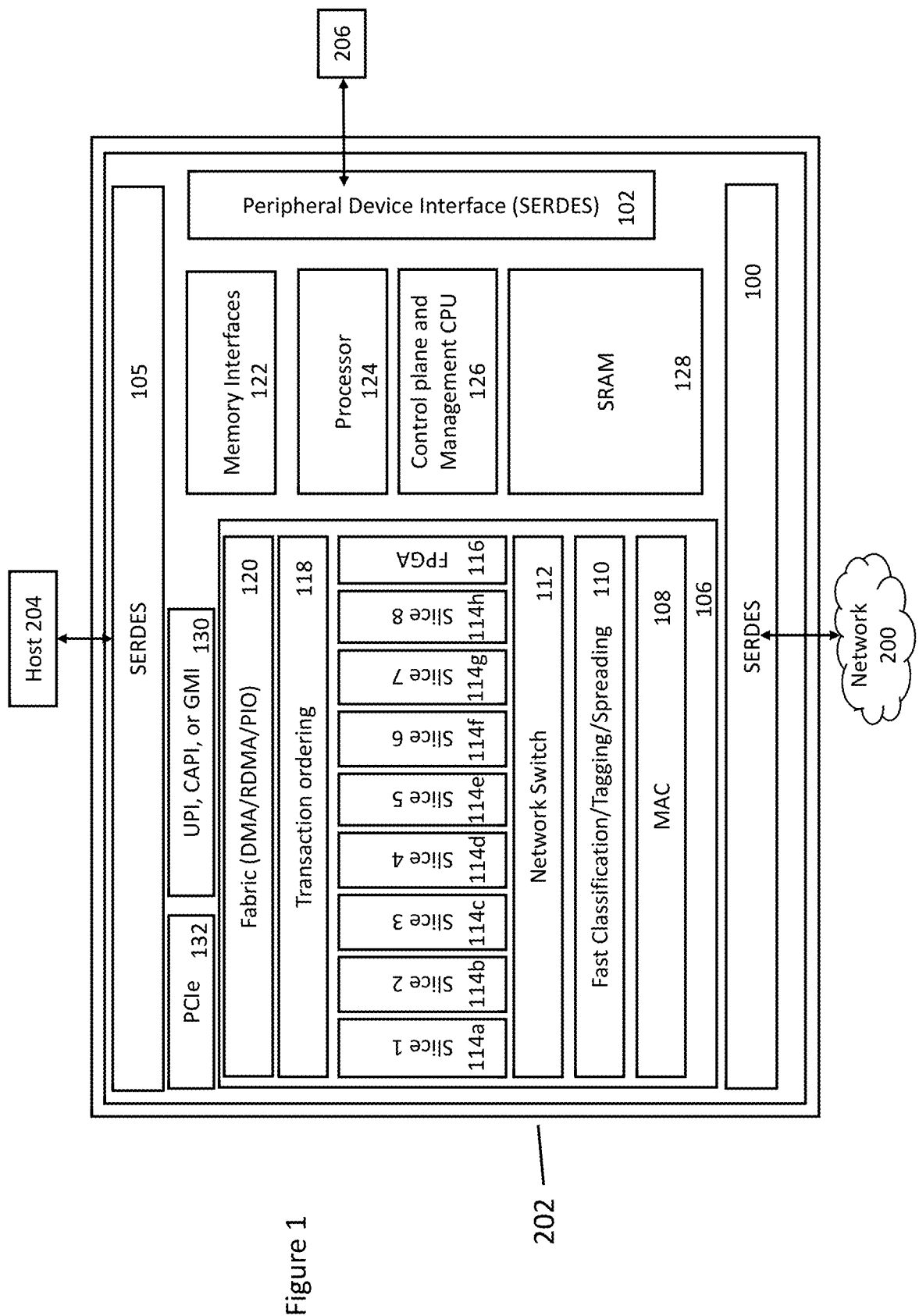
FIG. 1 shows a schematic diagram of a network interface device according to an embodiment.

The following description is presented to enable any person skilled in the art to make and use the invention and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

Network interface devices with FPGAs (field programmable gate arrays) have been proposed. FPGAs may offer the ability to deploy a circuit which provides an application specific solution. However, FPGAs may be relative difficult to program. An FPGA can allow for customization of a network interface device. Such applications may, for example, be niche or small volume applications.

Network interface devices with one or more ASICs (application specific integrated circuit) have been proposed. These ASICs may allow the network interface to perform specific functions relatively quickly and efficiently. ASICs have the advantage of being computationally efficient. The costs associated with such solutions may be dependent on the volumes of such devices required.

Some embodiments may have at least one ASIC and at least one FPGA on that ASIC. That FPGA is embedded in the ASIC. An ASIC is an integrated circuit or die which is customized for a particular purpose or purposes. In some embodiments, the ASIC may be configured to be customized to provide particular network interface functions. An ASIC is sometimes regarded as being a semiconductor which is intended for a specific application purpose rather than a general purpose programmable function. The FPGA is an array of programmable logic blocks. A FPGA may be characterised as being reprogrammable at the logic element granularity. An FPGA may be regarded as being an array of gates.

In some embodiments the FPGA is arranged so that it can communicate with a host device and a controller on the network interface device using for example relatively wide memory apertures and/or a dedicated relative high bandwidth interconnect and/or a relatively low latency interconnect.

Network interface devices are sometimes referred to as network interface cards NIC. It should be appreciated that network interface devices or NICs may be provided by a card but not necessarily. The network interface device may be provided separately from a host device or may be integrated into the host device.

Some embodiments may provide a network interface device with a CPU (central processing unit) for application processing. The CPU may be a general purpose CPU. The CPU may be provided separately to the ASIC of some embodiments.

Some embodiments may support Ethernet applications and/or RDMA (remote direct memory access) over Ethernet or Infiniband D3 for higher performance applications.

Some embodiments may provide a network interface device with a chip to chip interface. This may have an improved functionality from the perspective of both physical attachment and the programming model. This interface may be provided by SERDES (Serialisation/deserialization) and a suitable bus protocol. This bus protocol may be Interlaken or any other suitable protocol. This may enable one or more of: SoC (system on chip integration (with multiple IO (input/output) Bus as an option), flexible hardware/software communication abstractions, and co-device attachment. For example, this may be a FPGA and co-processor in the form of a CPU or GPGPU ((general purpose graphics processing unit). Alternatively, or additionally some embodiments may be used to attach off chip memory to be used an extension to internal memory of the network interface device. That internal memory may be any suitable memory, such as SRAM (static random access memory).

Some embodiments may allow the providing of one or more on a network interface device: a specific ASIC, specific IP provided on a FPGA; specific IP provided in a SoC. This latter option may be provided outside the ASIC of some embodiments. Some embodiments may have an FPGA within the ASIC and optionally a further FPGA outside the ASIC. Some embodiments may provide the ability to have a basic design which can be configured to suit a number of different scenarios.

In some embodiments, an FPGA is embedded in an ASIC. As will be described in more detail, the FPGA is architecturally presented as an uncommitted data-path slice.

In some embodiments, the network interface device is able to support RDMA protocols. In some embodiments, native D3 (infiniband) physical layers are implemented.

Some embodiments may provide a network interface device which is unencumbered with silicon implementation detail and can be programmed (and debugged) using a tool chain or high level language. The tool chain or high level language may be the same or different to the tool chain or language used to program the FPGA slice.

Some embodiments may provide a network interface device which is able to support non-volatile memory network storage protocols such as NVMe (non-volatile memory express) and the fabric transport plugins. This may be for RDMA, TCP/IP (Transmission Control Protocol/Internet Protocol) based standards or any other suitable standard.

Sometimes different features may result in conflicting design considerations. For example, ultra-low latency may be obtained at the expense of flexible parsing. Flow steering based on perfect matching may be at odds with the proliferation of network overlay protocols which do not require complete parsing of frames. Some embodiments may provide a network device with flexibility to deal with competing concerns.

Reference is made to FIG. 1 which shows an example of a network interface device 202.

In some embodiments one or more of the following components may be provided by an ASIC (application specific integrated circuit) 106 on the network interface device: a MAC (media access control) function, a classifying function, a network switch, data slices, an embedded FPGA, a transaction ordering function and a fabric.

First SERDES circuitry 100 is provided to interface between the network interface device 202 and the network 200. The first SERDES circuitry 100 is configured to perform the physical signalling of data packets to the network and the receiving of the data packets from the network.

A MAC function 108 provides MAC level processing. This is provided for both data which is received from the network and data which is to be put onto the network. This MAC processes received data from the first SERDES and/or provides an output to the first SERDES. The MAC function may provide an output to a classifying function 110.

The classifying function 110 may carry out one or more of the following functions:
classify the received data;
tag the received data and spread the received data.

The classification of the received flow may identify the flow with which the data is associated. The data may be tagged. This tag may be provided as metadata for that data. There may in some embodiments be other metadata such as a time stamp. This may facilitate in the reordering of data of a particular flow if it different parts of the data are processed by different slices or data pipelines. The spreading of the received data may be to spread the data of a particular flow between two or more different slices or data pipelines. This function will decide which data goes to which data slice.

This classifying function may not be necessary for some data transmission from the network interface device onto the network. For example, a slice may pull the data which is to be transmitted via a DMA action.

In some embodiments, the classifying function may provide additional classification with one or both of a respective transmit slice and a respective receive slice.

A network switch 112 is configured to cause the received data to be provided to a respective data slice for received data. For the data, which is to be transmitted by the network, the network switch may direct the data output from the data slices to the MAC function 108.

A plurality of so-called slices or data pipelines 114 is provided. In the example shown, eight slices 114a to h are provided. However, it should be appreciated that in other embodiments, a different number of slices are used. In one embodiment, a slice may be arranged to process received data or to process data to be transmitted. In other embodiments, a slice may be arranged such that it is able to process received data and data to be transmitted. In some embodiments, the number of slices may be the same as the number of ports. In some embodiments, there may be a transmit slice and a receive slice for each port. In some embodiments, there may not be a direct correlation between the number of ports and the number of slices. In some embodiments, a slice can be switched dynamically from processing received data to processing transmitted data and vice versa. This may be used to load balance a fluctuating work load.

Each slice may be regarded as a processing engine. Each slice may thus execute micro code to implement functions such as one or more of parsing, matching, offload and delivery semantics for the data path. The slice may act on any bit of a frame.

The slices may perform a parsing action on the data which the slice is processing. There may be a matching action which matches the data against for example a filter. There may an action function which performs an action or not in dependence on the result of the matching. This may, for example, be provided by eBPF (enhanced Berkeley packet filter) programmes and/or P4 programming and/or by directly programming a set of mini-engines.

One or more slices may operate with different semantics and/or firmware. The ASIC may support dynamic repurposing of each slice while operating under the load. This may comprise, for example, loading of new or updated firmware instructions.

An FPGA (field programmable array) 116 is provided in parallel with the slices 114. The FPGA is interfaced into the data path. The FPGA may be reconfigured as part of a firmware update. The FPGA is logically an additional packet processing slice. In some embodiments, the FPGA may be reconfigured at any time, even while under load. In this scenario, the packets or data being handled by the FPGA may be explicitly dropped during reconfiguration by the classifier or the packets or data may be temporarily routed to the ASIC slices.

The FPGA may be used for any suitable purpose. For example, the FPGA may be used to reduce data in one or more flows. For example, the FPGA may remove duplicate messages in an arbitration application. The FPGA may alternatively or additionally be used to aggregate data. For example, the FPGA may buffer and consolidate network captures for more efficient host delivery. Alternatively, or additionally, the FPGA may be used for hybrid processing. For example, the FPGA may provide a toolkit to enable hybrid applications to implement fast-path processing (low-latency) on the FPGA while using a slice to handle slower (and more complex TCP) protocol activity. This is also known as Delegated-Send on the transmit side. The FPGA may be used detect frames which are part of DDOS (distributed denial of service) attack. Those frames may be dropped or filtered. The FPGA may alternatively or additionally be used for machine learning, for example with a neural network or the like. The FPGA may alternatively or additionally be used to perform a software defined networking function. The FPGA may alternatively or additionally be used to implement an OpenCL (open computing language) kernel. The FPGA may alternatively or additionally be used to implement a high level language offload.

As an alternative to the FPGA which logically is an additional packet processing slice, one or more alternative processor architectures such as a GPGPU, TPU (tensor processing unit) and IPU (intelligent processing unit) may alternatively be embedded in the ASIC. One or more of these alternative processor architectures may be provided which logically act as an additional processing slice. A TPU or IPU may be optimised to execute a neural network.

In some embodiments, a transaction ordering function 118 is provided. This may ensure that the data which is provided to the host is in the same order as the data which is received for a particular flow. For example, a received flow may be allocated to two or more slices so that the received flow can be processed more quickly. The output from the respective slices will be reordered, if necessary, to preserve the order of the received data. Frames from a given MAC or with a given priority can be parallelized over slices and delivered to the host in flow or wire order. Where TCP or a similar protocol is used, the data may be in 5 tuple order. Frames transmitted from the host can be internally processed in parallel but will appear on the wire (at a given MAC/priority) in descriptor order. It should be appreciated that the transaction ordering function does not typically need to do anything in relation to data which is to be transmitted to the network but there may be some situations where the transaction ordering function may be used with data to be transmitted. In some embodiments reordering of frames from different flows may be permitted but not reordering of frames within a given flow.

A fabric layer 120 is provided to support DMA (direct memory access), PIO (programmed input/output), and/or RDMA between the host and the network interface device.

The network interface devices may be provided as a peripheral which is connected to the host 204 over a peripheral bus, such as PCIe (peripheral component interconnect express) or the like. The network interface device has one or more instances of a PCIe, referenced 132. In this example there may be four instances. The PCIe may be used for direct attachment to a remote CPU. The remote CPU may be provided in the host. The PCIe may be use for side car implementation with one or more of a FPGA, a CPU, a NPU (network processing unit) and NVME storage. In other words, the PCIe provides an interface to the FPGA, CPU and/or memory interfaces to allow communication between these devices.

The network device may have a UPI (ultrapath interconnect), CAPI (coherent accelerator processor interface) or GMI (global memory interconnect) 130. These are other examples of non PCI bus interfaces. These bus interfaces may be cache coherent.

Second SERDES circuitry 105 is provided to interface between the network interface device 202 and the host 204. The second SERDES circuitry 105 is configured to perform the physical signalling of data or data packets to and from the host.

The network interface device may comprise one or more other functional blocks, for example memory interfaces 122, a CPU 124, a control plane and management CPU and a memory 128. The memory may be in the form of a SRAM or be any other suitable memory. There may be one or more different versions of the ASIC with various other integrated blocks. For example, the capability of the processor and/or the number of processors may be varied.

Optionally, third SERDES circuitry 102 is provided to interface between the network interface device 202 and one or more other devices 206. The one or more other devices may be any suitable other device and may for example be another network interface device, another part of the network device or another device not part of the or a network interface device. The other device may take the form of an integrated circuit or chip or die. The third SERDES circuitry 102 is configured to perform the physical signalling of data or data packets to and from the host.

Figure 3:
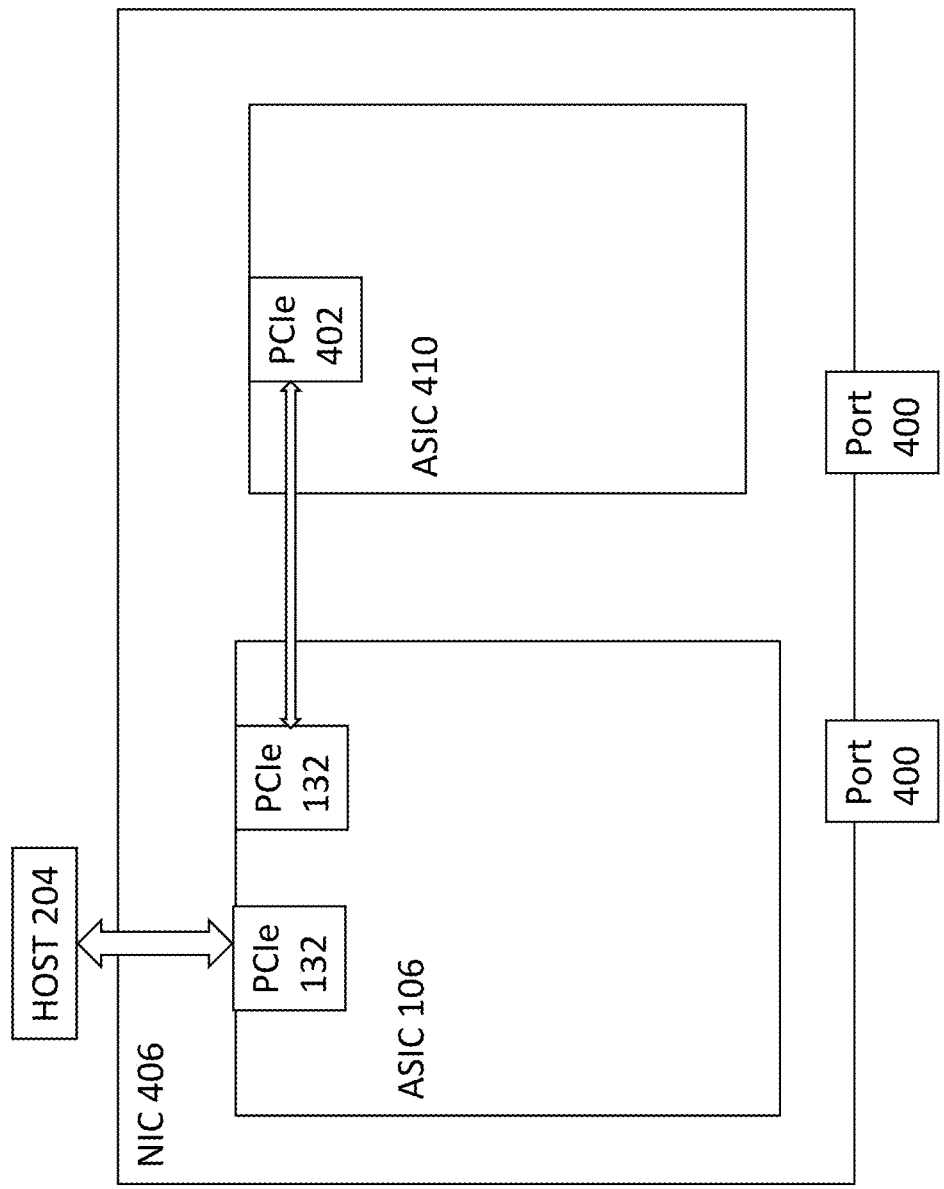
FIG. 3 shows a modification to the system shown in FIG. 2.

By way of example only, reference is made to FIG. 3 which shows a modified network interface device 406. In this arrangement the ASIC 106 of the network interface device has a PCIe interface with the host 204 and a PCIe interface with a second ASIC 410. Both of the ASICs 401, 410 may be provided on a single network interface device 406. The network interface device 406 may be provided with one or a plurality of ports 400. As discussed previously the ASIC 106 may interface with the ports 400 directly. In some embodiments the second ASIC 410 will have direct access to the ports. In other embodiments, the second ASIC 410 will have access to the ports 400 via the first ASIC 106. The second ASIC 410 may provide a peripheral device which implements a PCIe interface or another supported bus interface such as AXI (Advanced extensible interface) or CAPI.

In some embodiments the PCIe interface 132 of the first ASIC 106 will act as root complex for the PCIe interface 402 of the second ASIC 410.

Figure 4:
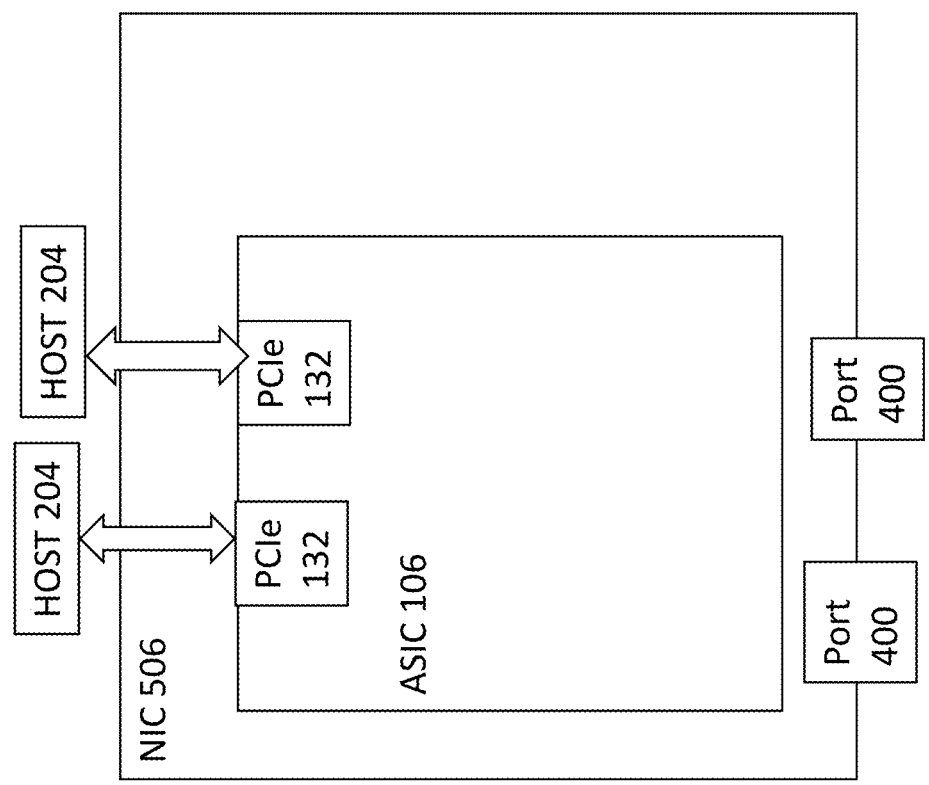
FIG. 4 shows another modification to the system shown in FIG. 2.

Reference is made to FIG. 4 which shows a modified network interface device 506. This may be used with the arrangement of FIG. 3 or without the arrangement of FIG. 3. The network interface device has a plurality of PCIe 132 blocks which act as endpoints for respective hosts 204. This allows the direct connection of the ASICs to a plurality of hosts or CPUs. This may enable ASIC resource sharing. The arrangement of FIG. 4 shows two hosts, It should be appreciated that there may be more than two hosts or CPUs.

The host computing device could be any kind of computing device, including: a server, a personal computer, a switch, a router, a bridge, and a portable device such as a tablet computer or smartphone. The host computing device supports a software environment such as an operating system that in turn supports one or more applications. The operating system could itself be part of a virtualised system comprising one or more guest operating systems supported by a privileged software domain, such as a hypervisor In some embodiments, time stamps for data received from the network at the SERDES between the network and the network interface and/or time stamps for data put onto the network at the SERDES between the network and the network interface may be required. The time stamp information may be added to the data as metadata. As far as data to be transmitted is concerned, the host may consider the transmit operation to be logically completed at the time of DMA completion rather than when the data is actually completed. Accordingly, in some embodiments, there may be optionally be two transmit events, one for the DMA and one for time stamps. The host may choose to receive one or both events.

Figure 2:
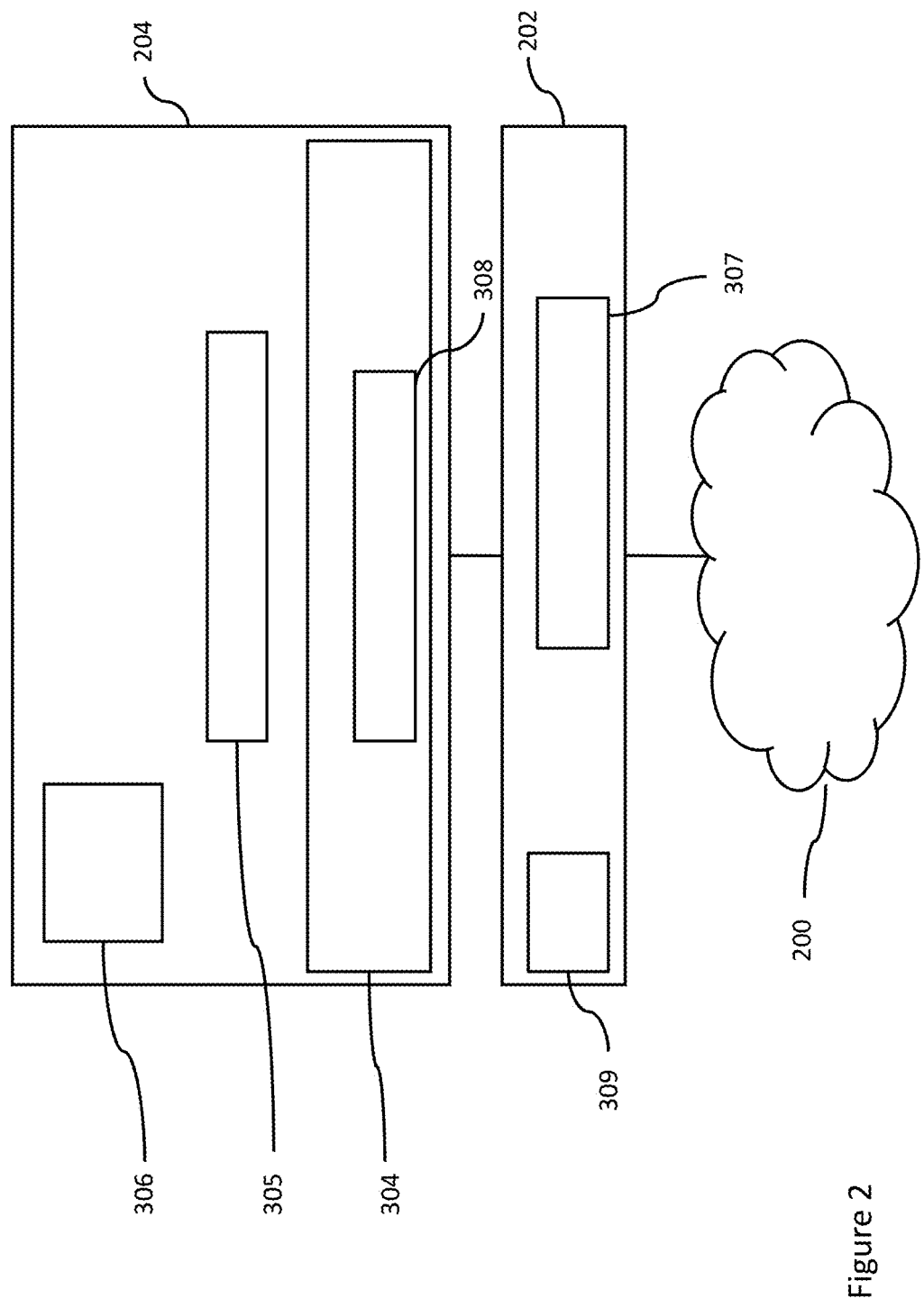
FIG. 2 shows a first system in which a network interface device such as shown in FIG. 1 may be used.

Reference will now be made to FIG. 2 which shows an arrangement in which a network interface device such as shown in FIG. 1 may be used.

The arrangement of FIG. 2 comprises a data processing system. The data processing system comprises a host computing device 204 coupled to a network interface device 202 that is arranged to interface the host to the network 200. The host computing device includes a host transport engine 305, which would typically be a software network protocol stack supported at an operating system 304. In FIG. 2 the host transport engine is a network stack at user level along with an application 306, but alternatively the host transport engine could be provided at the operating system and operate in the kernel context. The operating system could be a conventional monolithic operating system, a privileged domain (e.g., a hypervisor) supporting one or more virtualised operating systems, or a virtualised operating system itself. There could therefore be multiple software environments at the host computing device.

The host transport engine is operable to process application layer messages so as to encapsulate each message in data packets in accordance with a transport stream protocol such as TCP. The host transport engine would typically also perform protocol processing according to one or more additional protocols. For example, if the network interface device 202 is an Ethernet NIC, the engine could be configured to form data packets in accordance with TCP, network layer internet protocol (IP) and link layer Ethernet (IEEE 802.3) so as to form data packets having a nested set of protocol headers as follows:

[Ethernet[IP[TCP<payload data>]]]

where transport layer TCP is carried within an IP packet which is carried within an Ethernet packet. Link (e.g., Ethernet) and network layer (e.g., IP) protocol processing may be performed at either a host device or a network interface device and this will not be discussed further. There may also be additional protocol layers above the transport layer—for example, quality of service protocol layers—and these can also be handled according to any suitable manner. These may be managed at the device, for example by the host transport engine 305 or at an application.

The host transport engine is shown in FIG. 2 as a single homogeneous unit but could in fact be a collection of multiple processing entities located in hardware (e.g., at a network interface device or other peripheral device), and/or at the operating system (e.g., running in the kernel context), and/or at user level (e.g., at a user level transport library). The host transport engine could additionally be capable of handling data flows in accordance with any number of other connected-oriented or connectionless protocols.

Application 306 at the host computing device can transmit data over network 200 by means of the host transport engine 305 by passing messages to the host transport engine for transmission in accordance with the transport stream protocol. Typically, those messages will be configured in accordance with an application layer protocol such as HTTP (e.g. in the case of data from a web server running at the host) or IMAP (e.g. in the case of data from an email server running at the host).

In the example shown in FIG. 2, a further transport engine is provided in the form of a device transport engine 307 that is coupled to the host transport engine 305 and configured to receive and/or transmit data over transport streams on behalf of a device application 309. Device application 309 is configured to consume and/or produce application data communicated over transport streams and is located in hardware close to the device transport engine 307. The device application 309 and the device transport engine 307 are provided on the network interface device 202.

At least a part of the functionality of at least one of the device transport engine and the device application is provided by at least one of the slices and the FPGA. Alternatively, or additionally in some embodiments, at least a part of the functionality of at least one of the device transport engine and the device application may be provided by the application processor.

The application processor may be a single CPU or a cluster of two or more CPUs sharing cache memory. The application processor may include standard hardware components such as an MMU (memory management unit) and peripherals to enable execution of a general purpose operating system such as Linux. The application processor may contain accelerator units to enable efficient operation for computationally intensive tasks such as cryptograph and floating point or matrix operations. The application processor may terminate and act as a bridge device for man in the middle functions which require full TLS (transport layer security) decrypt/re-encrypt operations.

The device transport engine function is configured to transmit and/or receive application data of the device application over transport streams by performing limited transport stream processing in dependence on state passed to it from host transport engine 305. The device transport engine may be controlled by means of a driver 308 at the operating system of the host device (which could be the driver of the NIC).

The device application 309 is configured to form or consume application layer messages in accordance with an upper layer protocol. The payload data of the messages could be generated at the device application, perhaps in response to receiving information from network 200 or host computing device 204.

For example, device application 309 could be a trading algorithm embodied in a CPU of the network interface device and configured to receive one or more feeds from electronic financial exchanges over the network. In response the trading algorithm could generate trades or normalised feed data from the received financial data for encapsulation in application layer FIX (financial information exchange) messages and transmitted over a transport data stream by means of the device transport engine provided by one or more data slices.

In another embodiment, the network interface device may not perform transport or TCP layer processing, this being done by the host device. The network interface device may be configured to perform upper layer (above transport layer) protocol processing. For example, the network interface device may be configured to perform application level processing. In some embodiments, the application may be terminated in the host or in the network interface device.

Various example standards and protocols have been discussed. It should be appreciated that this is by way of example only and other embodiments may use any other suitable protocol or standard.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description, it will be evident to a person skilled in the art that various modifications may be made within the scope of the invention.

The invention claimed is:

1. A network interface device comprising:
a network interface; and
an integrated circuit comprising:
(i) application specific integrated circuit (ASIC) logic,
(ii) a programmable logic, wherein the ASIC logic and the programmable logic provide a plurality of data processing pipelines, including an ASIC logic implemented data processing pipeline and a programmable logic implemented data processing pipeline, arranged to process data, which has been received from a network connected to the network interface, and process data which is to be put onto said network, and
(iii) a network switch configured to receive at least one dataflow from the network interface and to provide as an output to the plurality of data processing pipelines, the at least one dataflow being spread between the ASIC logic implemented data processing pipeline and the programmable logic implemented data processing pipeline, wherein at least one data processing pipeline is configured to perform one of: (i) switching from processing data received from the network to processing data to be put onto said network; and (ii) switching from processing data to be put onto said network to processing data received from the network.

2. The network interface device as claimed in claim 1, wherein the network interface device comprises:
a transaction ordering device configured to receive outputs from the data processing pipelines which process data received from the network, and to ensure that the outputs received from the data processing pipelines are provided to a host device in an order that the data was received in, at the network interface.

3. The network interface device as claimed in claim 1, wherein said programmable logic is configured to perform one or more of:
reduce data in one or more flows;
aggregate data in one or more flows;
perform hybrid processing;
detect a DDOS attack;
machine learning;
perform a software defined networking function;
provide an OpenCL kernel offload;
provide an offload function; and
take remedial action against a denial of service attack.

4. The network interface device as claimed in claim 1, wherein said programmable logic is arranged to be reconfigurable.

5. The network interface device as claimed in claim 4, wherein said programmable logic is arranged to be reconfigurable while said network interface is in use.

6. The network interface device as claimed in claim 5, wherein said network interface device is configured to cause data to be explicitly dropped when said programmable logic is being reconfigured while in use.

7. The network interface device as claimed in claim 5, wherein said network interface device is configured to cause data to be routed to one or more data processing pipelines provided by the ASIC logic when said programmable logic is being reconfigured while in use.

8. The network interface device as claimed in claim 1, wherein at least one data processing pipeline is configured to process data received from the network and at least one data processing pipeline is configured to process data to be put onto said network.

9. The network interface device as claimed in claim 1, wherein at least one data processing pipeline is configured to process data received from the network and to process data to be put onto said network.

10. The network interface device as claimed in claim 2, wherein the transaction ordering device is configured to ensure that data of a flow received from the data processing pipelines provided by the ASIC logic and a data processing pipeline as provided by the programmable logic and which has been processed in the data processing pipelines provided by the ASIC logic or the data processing pipeline as provided by the programmable logic is provided to the host device in an order that the data of the flow was received in, at the network interface.

11. The network interface device as claimed in claim 10, wherein network data is processed by at least one of the plurality of data processing pipelines provided by the ASIC logic and the data processing pipeline as provided by said programmable logic.

12. The network interface device as claimed in claim 1, comprising a peripheral device interface.

13. The network interface device as claimed in claim 12, wherein said peripheral device interface provides coupling by one or more of Peripheral Component Interconnect express (PCIe), Advanced extensible interface (AXi) and Coherent Accelerator Processor Interface (CAPI).

14. The network interface device as claimed in claim 12, wherein said peripheral device interface is provided by a second application specific integrated device.

15. The network interface device as claimed in claim 1, wherein the integrated circuit is an application specific integrated circuit.

16. The network interface device as claimed in claim 1, further comprising a host computing device interface configured to perform signaling of data or data packets to and from a host.

17. The network interface device as claimed in claim 1, wherein the ASIC logic further implements a classifying function comprising classifying data into flows, spreading dataflows among different data processing pipelines.

* * * * *